United States Patent
Richter et al.

[11] Patent Number: 6,119,339
[45] Date of Patent: Sep. 19, 2000

[54] NOZZLE RING FOR A GAS TURBINE AND METHOD OF MANUFACTURE THEREOF

[75] Inventors: Karl-Hermann Richter, Markt Indersdorf; Josef Reischl, Hebertshausen; Hans Juergen Schmuhl, Woerthsee; Klaus Breitschwerdt, Lauterbach; Ulrich Knott, Munich; Siegfried Boettcher, Oberschleissheim; Karlheinz Manier, Mitterscheyern; Werner Humhauser, Moosburg, all of Germany

[73] Assignee: MTU Motoren-und Turbinen-Union Munchen GmbH, Munich, Germany

[21] Appl. No.: 09/281,987

[22] Filed: Mar. 29, 1999

[30] Foreign Application Priority Data

Mar. 28, 1998 [DE] Germany ............ 198 13 958

[51] Int. Cl.7 .................................................. B21D 53/78
[52] U.S. Cl. ................................. 29/889.22; 29/889.21
[58] Field of Search ................................ 29/889.21, 889.22, 29/557, 428

[56] References Cited

U.S. PATENT DOCUMENTS

| | | | |
|---|---|---|---|
| 4,827,588 | 5/1989 | Meyer | 29/889.22 |
| 5,031,288 | 7/1991 | Sadler | 29/889.21 |
| 5,174,715 | 12/1992 | Martin . | |
| 5,697,152 | 12/1997 | Yamazaki et al. | 29/889.22 |
| 5,788,456 | 8/1998 | Maier | 29/889.22 |

FOREIGN PATENT DOCUMENTS 33 46 889 A1  12/1983  Germany .
42 03 655 A1   2/1992  Germany .

*Primary Examiner*—Irene Cuda
*Attorney, Agent, or Firm*—Hill & Simpson

[57] ABSTRACT

A worked nozzle ring for a gas turbine, in particular an aircraft engine, having at least one shroud and at least one blade sheet arranged thereon, whereby in order to create a worked nozzle ring that is easy to manufacture, the blade sheet comprises, at the frontal side, at least one two-dimensionally profiled connecting space region that is placed in a profiled opening formed in the shroud by means of beam cutting and is connected therewith.

18 Claims, 2 Drawing Sheets

NOZZLE RING FOR A GAS TURBINE AND METHOD OF MANUFACTURE THEREOF

FIELD OF THE INVENTION

The present invention relates to a worked or built nozzle ring for a gas turbine, as well as to a manufacturing method for a worked nozzle ring of a gas turbine. More specifically, the present invention relates to a nozzle ring for an aircraft engine which includes at least one shroud and at least one blade sheet.

BACKGROUND OF THE INVENTION

Nozzle rings are integral components that in general comprise an annular external shroud, a multiplicity of blade sheets and, if necessary, an annular internal shroud. Nozzle rings are used for example in high-pressure or low-pressure compressors of aircraft engines.

In a conventional manufacturing method, one-piece turbine blades, consisting of a blade sheet and an external platform are first manufactured by forging, casting or an ECM (electrochemical machining) process. Subsequently, in general, four to six such turbine blades are soldered together to form segments. In such a method, the comparatively high manufacturing costs are disadvantageous.

The object of the present invention is to create a manufacturing method for a nozzle ring of a gas turbine of the type specified above that can be executed as simply and as economically as possible. In addition, a nozzle ring that is economical to manufacture is to be created.

SUMMARY OF THE INVENTION

The solution of the object relating to the manufacturing method is inventively characterized by the steps: formation of at least one profiled opening in the shroud by means of beam cutting, formation of the blade sheet with at least one two-dimensionally profiled connecting region arranged at the frontal side, insertion of the connecting region into the profiled opening, and connection of the blade sheet with the shroud.

It is preferred that the blade sheet be two-dimensionally profiled, or, respectively, that it be fashioned in prismatic fashion over its entire length, whereby the blade sheet is thereby usefully manufactured by means of extrusion.

As an alternative, it can be advantageous for one sheet surface of the blade sheet to be fashioned in three-dimensionally profiled fashion.

It is highly preferable for the profiled opening in the shroud to be fashioned by means of (high-pressure) laser beam cutting, since with this method, in contrast for example to stamping, openings can be produced with reproducible geometries, without deformation of the adjoining boundary zones. After the laser beam cutting, it can be necessary for the beam exit side to require removal of burrs. With laser beam cutting, the relatively small radii of approximately 0.1 mm to 0.2 mm at the entry and exit sides of the profiled opening can be manufactured. It has turned out that the stamping of the profiled openings is not suitable or, respectively, possible due to the large ratio of the wall thickness of the shroud, approximately 2 mm to 3 mm, to the radii at the entry and exit sides of the openings.

Alternatively, it can be advantageous to fashion the profiled opening using water jet cutting, since with this method as well, or, respectively, with water-jet-guided laser beam cutting, the formation of the relatively small radii of approximately 0.1 mm to 0.2 mm is possible at the entry and exit sides of the profiled opening.

It is also preferable for the connection of the blade sheet and the shroud to take place by means of high-temperature soldering, whereby for the improvement of the soldering quality it is advantageous for the shroud to be nickel-plated chemically or galvanically after the formation of the profiled opening, and/or for the connecting region of the blade sheet to be nickel-plated.

For example for use in high-pressure compressors of aircraft engines, the blade sheet and/or the shroud can preferably be made of a nickel-based alloy. The method can preferably also be applied with materials such as Fe or Ti alloys, or TiAl.

In alternative applications, e.g., for preliminary designing in test benches, it can be useful for the blade sheet and/or the shroud to be made of plastic, whereby the connection of the blade sheet with the shroud then preferably takes place by means of gluing or the like.

In a preferred embodiment, the shroud is an external shroud that is fashioned with a U shape.

The method can also comprise the additional steps: provision of a support plate on the side surface of the shroud facing away from the blade sheet, fashioning of a profiled opening in the support plate that is aligned with the profiled opening in the shroud, insertion of the connecting region—protruding beyond the above-cited side surface—of the blade sheet into the profiled opening of the support plate, and connection of the connecting region of the blade sheet with the support plate, as well as connection of the support plate with the shroud. By means of such a supporting of the blade sheet in the region of the shroud, the vibrostability of a worked turbine blade can be increased, and can reach that of a conventionally manufactured turbine blade. The profiled opening in the support plate can be fashioned for example by means of stamping or laser beam cutting. The connection of the support plate with the shroud can preferably take place by means of high-temperature soldering, whereby in such a case the support plate can likewise be nickel-plated in order to improve the soldering quality.

In a preferred construction, the blade sheet is fashioned with two two-dimensional connecting regions arranged on the frontal sides of opposite-lying ends, which connecting regions are connected with an external shroud and, in addition, with an internal shroud. The blade sheet is thereby respectively profiled two-dimensionally at the frontal side for connection with the external and internal shroud, and can be profiled two- or three-dimensionally in the region of the sheet surface. Preferably, a honeycomb sealing or, respectively, honeycomb is applied to a side surface of the internal shroud and joined by means of HT soldering.

Preferably, a multiplicity of blade sheets are provided, whereby the method is then concluded with the step: segmenting of the worked nozzle ring by means of abrasive cutting, a wire EDM electrical discharge machining process, or the like. In such a construction, the shroud is of annular construction, and comprises a number of profiled openings corresponding to the number of blade sheets, which openings are subsequently separated to form segments with e.g. four or six blade sheets.

The part of the solution relating to the worked nozzle ring is inventively characterized in that the blade sheet comprises, at the frontal side, at least one two-dimensionally profiled connecting region that is placed into a profiled opening fashioned in the shroud by means of beam cutting and is fastened thereto or, respectively, connected therewith.

In a preferred construction, the profiled opening is fashioned in the shroud by means of laser beam cutting, since in this way the comparatively small radii of approximately 0.1 mm to 0.2 mm at the entry and exit side of the profiled opening can be reproduced, and can be fashioned without deformation of the adjoining edge regions.

Preferably, the blade sheet is connected with the shroud by means of high-temperature soldering, whereby it is advantageous that the shroud and/or the connecting region of the blade sheet be nickel-coated. It is highly preferable that the blade sheet comprise, at two opposite-lying ends, two-dimensionally profiled connecting regions fashioned at the frontal side, said regions being connected with an external shroud and in addition with an internal shroud.

In an embodiment, the present invention provides a method of manufacturing a worked nozzle ring for a gas turbine. The nozzle ring includes at least one shroud and at least one blade sheet. The method comprises the steps of beam cutting at least one profiled opening in the shroud, forming the blade sheet with at least one two-dimensionally profiled connecting region arranged on a front side of the blade sheet, inserting the connecting region of the blade sheet into the profiled opening of the shroud and connecting the blade sheet to the shroud.

In an embodiment, the length of the blade sheet is two-dimensional.

In an embodiment, the blade sheet comprises a sheet surface which is three-dimensional.

In an embodiment, the step of forming the blade sheet comprises milling.

In an embodiment, the step of forming the blade sheet comprises profile grinding.

In an embodiment, the step of beam cutting is further characterized as high-pressure laser beam cutting.

In an embodiment, the step of beam cutting is further characterized as water-jet cutting.

In an embodiment, the method further includes the step of nickel-plating the shroud.

In an embodiment, the step of forming the blade sheet further comprises nickel-plating the blade sheet.

In an embodiment, the step of connecting the blade sheet to the shroud comprises high-temperature soldering.

In an embodiment, the blade sheet and/or the shroud are fabricated from a material consisting of nickel, titanium, a nickel-based alloy, a titanium alloy and plastic.

In an embodiment, the step of connecting the blade sheet to the shroud includes gluing the blade sheet to the shroud.

In an embodiment, the shroud is an external shroud.

In an embodiment, the shroud is connected to a support plate and a profiled opening is formed in the support plate that is in alignment with the profiled opening in the shroud and the inserting step further comprises inserting the connecting region of the blade sheet through both the profiled opening of the shroud and the profiled opening of the support plate and the connecting step further comprises connecting the blade sheet to the shroud and the support plate.

In an embodiment, the nozzle further includes an inner shroud and an outer shroud and the beam cutting step further comprises beam cutting profiled openings in both the inner and outer shroud and the step of forming the blade sheet comprises forming two-dimensionally profiled connecting regions disposed at opposing ends of the blade sheet and the inserting step further comprises inserting each connecting region of the blade sheet into the profiled opening of one of the inner and outer shrouds and the connecting step further comprises connecting the blade sheet to both the inner and outer shrouds.

In an embodiment, a plurality of blade sheets are utilized and the method further includes the step of segmenting the nozzle ring with a process selected from the group consisting of abrasive cutting and wire EDM.

In an embodiment, the present invention provides a nozzle ring as described above.

Other objects and advantages of the invention will become apparent upon reading the following detailed description and appended claims, and upon reference to the accompanying drawings.

BRIEF DESCRIPTION OF THE DRAWING

In the following, the invention is explained in more detail on the basis of embodiments, with reference to a drawing, wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
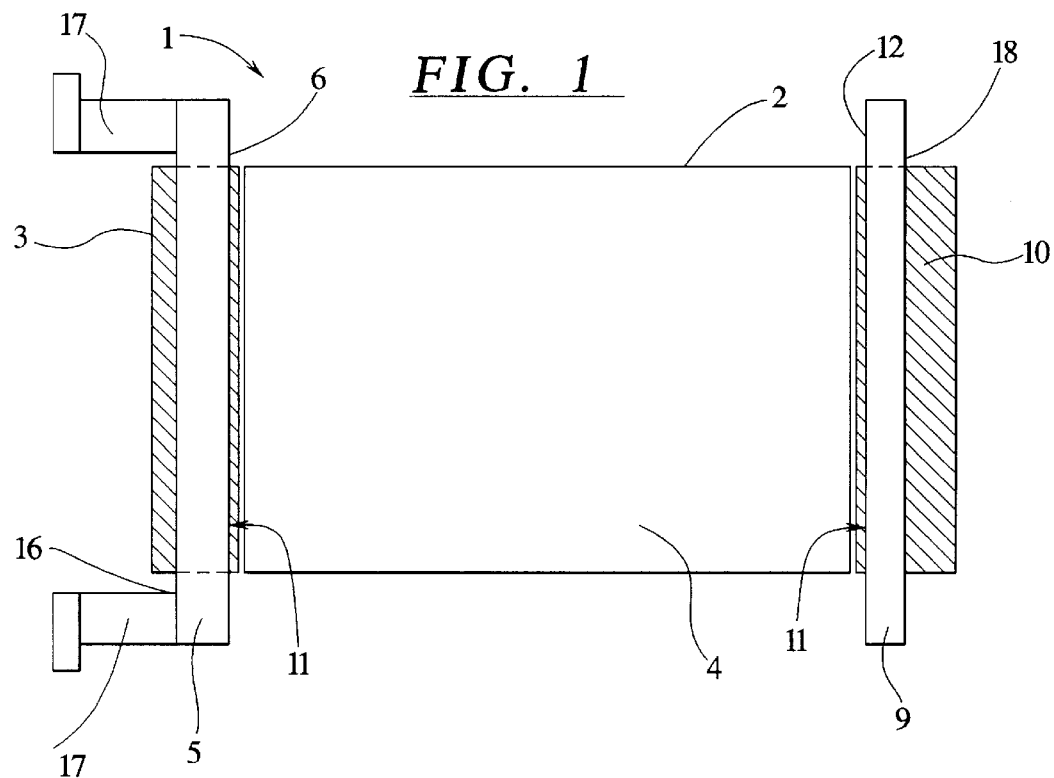
FIG. 1 is a schematic side view of an embodiment of the nozzle ring of the present invention.

FIG. 1 is a side view, limited to the essential parts for better visibility, of a worked nozzle ring, designated 1 as a whole, used for example in a high-pressure compressor of aircraft engines. The worked nozzle ring 1 comprises a blade sheet 2 with two connecting regions 3 and 10, provided at frontally opposite-lying ends of the blade sheet 2, and a sheet surface 4, as well as an annular external shroud 5 and an annular internal shroud 9, manufactured for example by means of turning. The worked nozzle ring 1 is made of a nickel-based alloy. Alternatively, it can for example also be made of a Ti alloy or of TiAl.

While the two connecting regions 3, 10 are fashioned two-dimensionally, the remaining part of the blade sheet 2 comprises a three-dimensional profile. In the present embodiment, the blade sheet 2 is manufactured by means of milling. Alternatively, the blade sheet 2 can be profiled two-dimensionally over its entire length, and can for example be manufactured economically by extrusion.

The external and internal shroud 5 or, respectively, 9 respectively comprises a side surface 6 or, respectively, 12 facing inward, in which profiled openings 11 are respectively made by means of beam cutting. The profiled openings 11 are fashioned so as to be equidistant along the respective shroud 5 or, respectively, 9, whereby according to the application an irregular distribution can also be provided, and comprise a shape corresponding to the profile of the connecting region 3, 10 of the blade sheet 2. For aerodynamic reasons, the profiled openings 11 thus comprise relatively small radii of approximately 0.1 mm to 0.2 mm in the region of an entry and exit side 14 or, respectively, 15, whereby the wall thicknesses of the external and internal shroud 5, 9 are generally approximately 2 mm to 3 mm. In order to enable manufacture of the profiled openings 11 with their small radii at the entry and exit sides 14, 15 in reproducible fashion and without deformations in the regions of the external and internal shrouds 5, 9 adjoining the profiled openings 11, these profiled openings are fashioned by means of laser beam cutting.

In an alternative embodiment, the forming of the openings is carried out by means of high-pressure laser beam cutting with the use of an inert cutting gas, such as e.g. $N_2$. In this way, there result metallic blank sheared edges that are advantageous for the later joining process, e.g. by means of vacuum high-temperature soldering. After the laser beam cutting, the beam exit side, i.e. a side surface 16 lying opposite the respective inward-facing side surface 6, 12 of the external and internal shroud 5, 9, is de-burred if necessary.

Subsequent to the fashioning of the profiled openings 11 by means of laser beam cutting, the two shrouds 5, 9 are completely (chemically or galvanically) nickel-plated in order to improve the quality of the solder joint during the subsequent connection of the blade sheets 2 with the external and internal shroud 9. For this reason, the two connecting regions 3, 10 of the blade sheet 2 are also nickel-plated.

Before the high-temperature soldering, the blade sheets 2 are inserted with their connecting regions 3, 10 into the profiled openings 11 fashioned in the external and internal shroud 5, 9, and for example are fixed by means of ball-point tack welding or some other suitable method. Subsequently, the soldering paste is respectively applied in the connecting zones, and the blade sheets 2 are connected with the shrouds 5, 9 by means of high-temperature soldering.

After the brush soldering, the internal shroud 9 is ground, or, if warranted, is also turned, on its side surface 18 lying opposite the inward-facing side surface 12. Subsequently, honeycomb seals are applied to the side surface 18 and are connected by means of HO soldering, whereby the operating temperature of the solder for the honeycomb seal is less than the melting temperature of the solder for the plug-in soldering.

Figure 2:
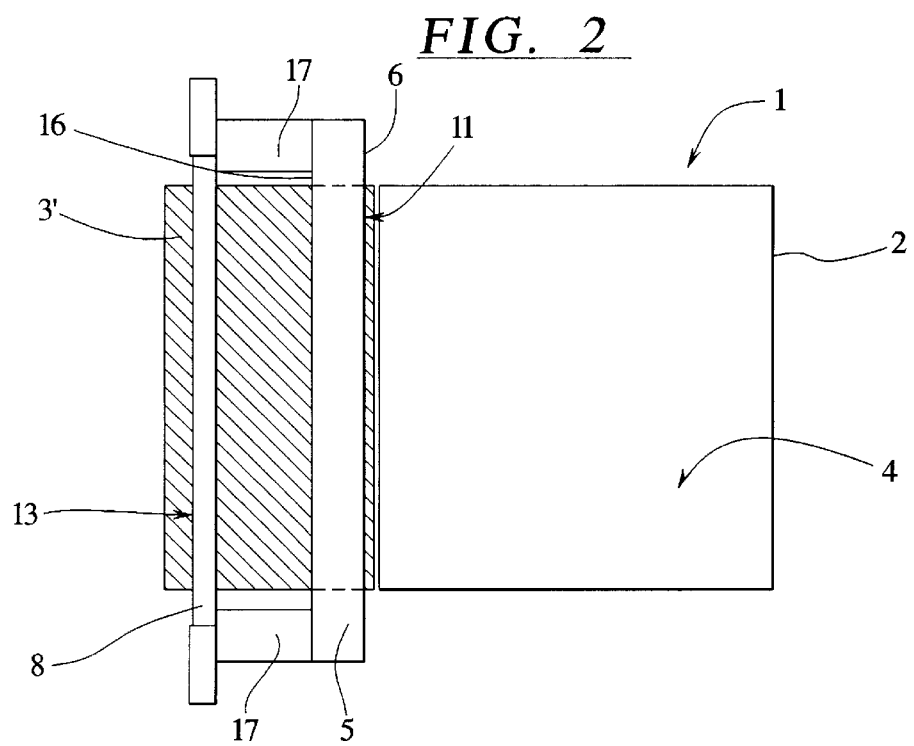
FIG. 2 is a schematic side view of a further embodiment of the nozzle ring of the present invention.

In the construction shown in FIG. 2 of a worked nozzle ring 1, a support plate 8 is provided on the side surface 16 of the external shroud 5 facing away from the blade sheet 2, in which support plate profiled openings 13 are provided that are respectively aligned with the profiled openings 11 in the external shroud 5. These profiled openings 13 can likewise be formed by means of laser beam cutting, whereby here another method, such as for example stamping, is also possible. In this construction, the two-dimensional connecting region 3' of the blade sheet 2 is lengthened, and is respectively inserted into the profiled opening 11 of the external shroud 5 and then into the profiled opening 13 of the support plate 8, and is thereby connected in the manner described above by means of high-temperature soldering. Likewise, the support plate 8 is connected with the two limbs 14 of the U-shaped external shroud 5. The support plate 8 can be provided as a continuous band or as individual plates respectively arranged in the region of the profiled openings 11 of the external shroud 5. In a worked nozzle ring 1, such a support plate 8 can be provided with or without an internal shroud 9.

Figure 3:
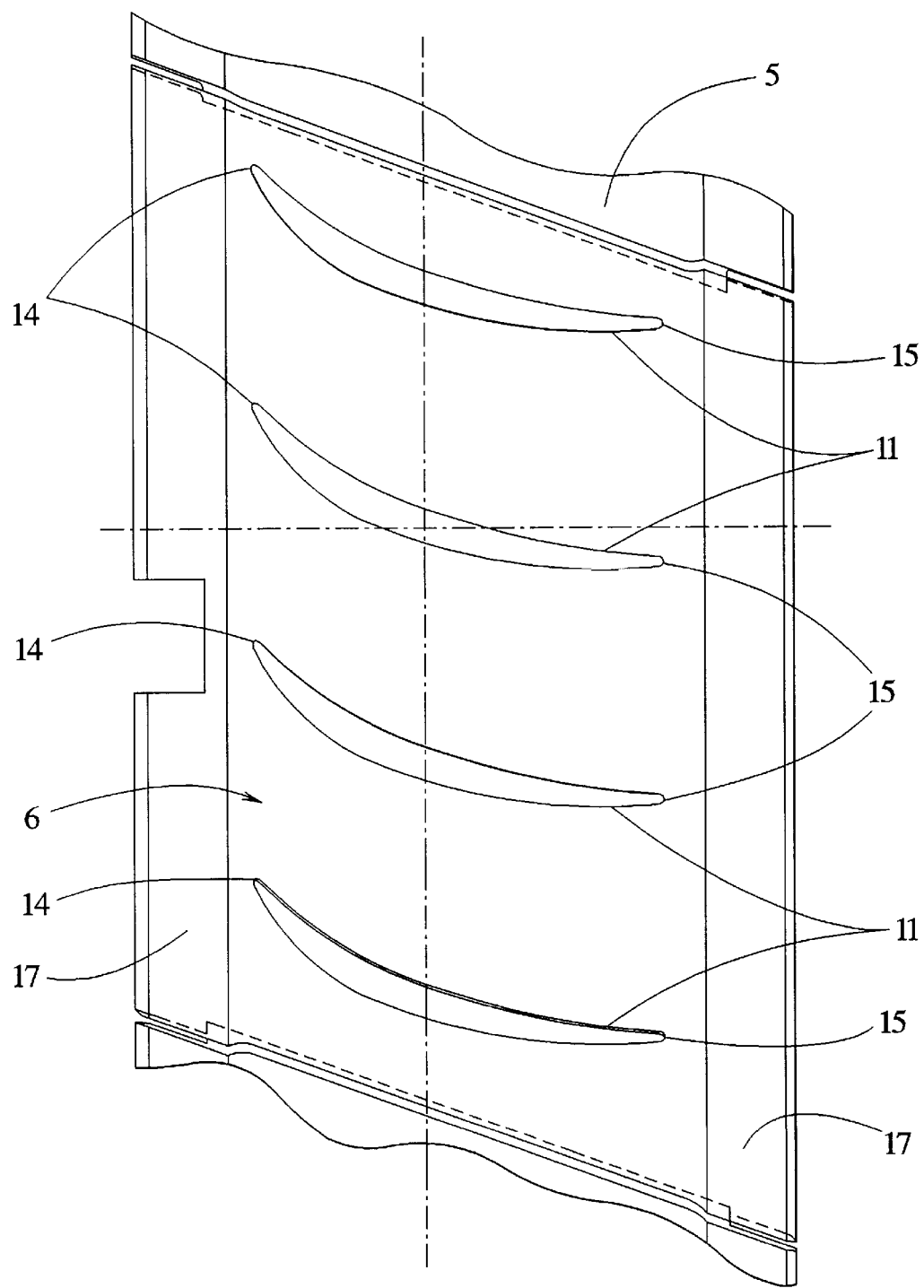
FIG. 3 is a schematic top view of a shroud according to the embodiments shown in FIGS. 1 and 2.

FIG. 3 shows a top view of a segment of the external shroud 5 with its internal side surface 12 and with the two limbs 17, located behind the image plane. The profiled openings 11 are provided in equidistant fashion along the external shroud 5, and comprise comparatively small radii of approximately 0.1 mm to 0.2 mm at their entry and exit sides 14 or, respectively, 15. The wall thickness of the external shroud 5 is approximately 2 mm to 3 mm. The profiled openings 11 can be reproduced by means of laser beam cutting, and are fashioned without deformations of the adjoining edge regions of the external shroud 5. The radii at the entry and exit side 14 or, respectively, 15 can thereby be widened slightly without negatively influencing the quality of the subsequent soldering step.

The nozzle rings 1, manufactured with annular external and, if warranted, internal shrouds 5 or, respectively, 9, can finally be halved or divided to form segments with e.g. four or six blade sheets 2, by means of wire EDM, abrasive cutting, or another suitable method. Alternatively, the worked nozzle ring 1 can also be segmented to form individual turbine blades 2.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed:

1. A method of manufacturing a worked nozzle ring for a gas turbine, the nozzle ring including at least one shroud and at least one blade sheet, the method comprising the following steps:

beam cutting at least one profiled opening in the shroud, forming the blade sheet with at least one two-dimensionally profiled connecting region arranged on a front side thereof, inserting the connecting region of the blade sheet into the profiled opening of the shroud, and connecting the blade sheet to the shroud.

2. The method of claim 1 wherein the front side of the blade sheet has a length, the length of the blade sheet being two-dimensional.

3. The method of claim 1 wherein the blade sheet comprises a sheet surface, the sheet surface being three-dimensional.

4. The method of claim 1 wherein the step of forming the blade sheet comprises milling.

5. The method of claim 1 wherein the step of forming the blade sheet comprises profile grinding.

6. The method of claim 1 wherein the step of forming the blade sheet comprises extrusion.

7. The method of claim 1 wherein the step of beam cutting is further characterized as high-pressure laser beam cutting.

8. The method of claim 1 wherein the step of beam cutting is further characterized as water-jet cutting.

9. The method of claim 1 further comprising the following step after the beam cutting step:

nickel-plating the shroud.

10. The method of claim 1 wherein the step of forming the blade sheet further comprises nickel-plating the blade sheet.

11. The method of claim 1 wherein the connecting step further comprises high-temperature soldering the blade sheet to the shroud.

12. The method of claim 1 wherein the blade sheet is fabricated from a material selected from the group consisting of Ni, Ti, a nickel based alloy, a titanium alloy and plastic.

13. The method of claim 1 wherein the shroud sheet is fabricated from a material selected from the group consisting of Ni, Ti, a nickel based alloy, a titanium alloy and plastic.

14. The method of claim 1 wherein the connecting step further comprises gluing the blade sheet to the shroud.

15. The method of claim 1 wherein the shroud is an external shroud.

16. The method of claim 1 wherein the shroud includes a side surface facing away from the blade sheet and the method further comprises the following steps prior to the inserting step:

attaching a support plate to the side surface of the shroud facing away from the blade sheet, forming a profiled opening in the support plate that is aligned with the profiled opening in the shroud, and the inserting step further comprises inserting the connecting region of the blade sheet through both the profiled opening of the shroud and the profiled opening of the support plate, and the connecting step further comprises connecting the blade sheet to the shroud and to the support plate.

17. The method of claim 1 wherein the nozzle further includes an inner shroud and an outer shroud, the beam cutting step further comprises beam cutting at least one profiled opening in both the inner shroud and the outer shroud, and the forming step further comprises forming a blade sheet with two two-dimensionally profiled connecting regions disposed at opposing ends of the blade sheet, and the inserting step further comprises inserting each connecting region of the blade sheet into the profiled opening of one of the inner and outer shrouds, and the connecting step further comprises connecting the blade sheet to both the inner and outer shrouds.

18. A method of manufacturing a worked nozzle ring for a gas turbine, the nozzle ring including at least one shroud and a plurality of blade sheets, the method comprising the following steps:

beam cutting a plurality of profiled openings in the shroud, forming each blade sheet with at least one two-dimensionally profiled connecting region arranged on a front side thereof, inserting the connecting regions each blade sheet into one of the profiled openings of the shroud, connecting the blade sheets to the shroud, and segmenting the nozzle ring with a process selected from the group consisting of abrasive cutting and wire EDM.

* * * * *